United States Patent
Agarwal et al.

(10) Patent No.: US 7,155,535 B2
(45) Date of Patent: *Dec. 26, 2006

(54) SOFTWARE APPARATUS FOR DISTRIBUTING AND PROVIDING FAULT-TOLERANCE TO PATH-VECTOR ROUTING PROTOCOLS

(75) Inventors: Puneet Agarwal, San Francisco, CA (US); Vivek Menezes, Burlingame, CA (US); Erol Basturk, Cupertino, CA (US)

(73) Assignee: Pluris, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/861,079

(22) Filed: Sep. 10, 2004

(65) Prior Publication Data

US 2004/0260825 A1    Dec. 23, 2004

Related U.S. Application Data

(63) Continuation of application No. 09/663,868, filed on Sep. 15, 2000, now Pat. No. 6,760,777.

(51) Int. Cl.
  *G06F 15/173*    (2006.01)
(52) U.S. Cl. .............. 709/238; 370/352; 370/353; 370/354; 370/355; 370/356
(58) Field of Classification Search .......... 709/238, 709/239, 240, 242, 243; 370/352–356
See application file for complete search history.

(56) References Cited

U.S. PATENT DOCUMENTS

| | | | | |
|---|---|---|---|---|
| 5,519,704 | A | * | 5/1996 | Farinacci et al. ............ 370/402 |
| 5,914,953 | A | * | 6/1999 | Krause et al. ............... 370/392 |
| 6,160,809 | A | * | 12/2000 | Adiletta et al. ............. 370/392 |
| 6,160,811 | A | * | 12/2000 | Partridge et al. ........... 370/401 |
| 6,529,481 | B1 | * | 3/2003 | Akyol et al. ................. 370/250 |
| 6,553,005 | B1 | * | 4/2003 | Skirmont et al. ........... 370/285 |
| 6,658,481 | B1 | * | 12/2003 | Basso et al. ................. 709/243 |
| 6,760,777 | B1 | * | 7/2004 | Agarwal et al. ............. 709/238 |

(Continued)

OTHER PUBLICATIONS

U.S. Appl. No. 09/663,868, Agarwal et al.

*Primary Examiner*—Bunjob Jaroenchonwanit
*Assistant Examiner*—Duyen Doan
(74) *Attorney, Agent, or Firm*—Donald R. Boys; Central Coast Patent Agency, Inc

(57) ABSTRACT

An inter-network method for distributing a path-vector routing protocol within a multi-processor router has steps of running an instance of a router-distributed Border Gateway Protocol (rdBGP) on each of a plurality of processors of the multi-processor router, establishing routing sessions between individual instances of rdBGP running on separate processors of the multi-processor router, and between individual ones of the instances of rdBGP and external protocol peers, exchanging routing information between instances of rdBGP and the external protocol peers, wherein the instances of rdBGP learn, from the external protocol peers, routes for a plurality of destinations, calculating independently, by each instance of rdBGP, a set of routes, including a best route, from each of the plurality of destinations learned from the external protocol peers, and sharing route information determined with the other instances of rdBGP running on separate processors in the multi-processor router, and updating route information according to information received from the other instances of rdBGP. Routing information is further shared with the external protocol peers, and fault tolerance is provided in some embodiments by establishing redundant communication sessions with external protocol peers.

12 Claims, 6 Drawing Sheets

U.S. PATENT DOCUMENTS 6,947,963 B1 * 9/2005 Agarwal et al. ............ 709/201

2002/0165981 A1 * 11/2002 Basturk et al. ............. 709/242

* cited by examiner

SOFTWARE APPARATUS FOR DISTRIBUTING AND PROVIDING FAULT-TOLERANCE TO PATH-VECTOR ROUTING PROTOCOLS

CROSS-REFERENCE TO RELATED DOCUMENTS

The present application is a continuation application of patent application Ser. No. 09/663,868 filed Sep. 15, 2000, now U.S. Pat. No. 6,760,777, entitled "Methods & Apparatus for Distributing, & Providing Fault-Tolerance to Path-Vector Routing Protocols," which is incorporated in its entirety by reference.

FIELD OF THE INVENTION

The present invention relates to methods and apparatus for providing computational scalability and fault-tolerance to path-vector routing protocols in a router. The invention also relates to distribution of a Border Gateway Protocol in a highly scalable, multiple processor router.

BACKGROUND OF THE RELATED ART

In the context of internetworking, routing is the coordinated transfer of information from a source to a destination via a router. Routers with the capability to forward data packets between subnetworks are referred to as intermediate systems (ISs). Intermediate systems may be classified as intra-domain ISs, i.e., those which can communicate within routing domains, and inter-domain ISs which can communicate both within and between routing domains. A routing domain, or autonomous system, can be considered to be a part of an inter-network that is regulated under common administrative authority.

A key component of routing is determination of optimal routing paths for data packets. Thereafter a second component, which may be referred to as "switching", comprises transporting packets through the internetwork. Determination of optimal routing paths relies on one or more routing protocols to provide and update a routing database, or route table, for each router in a network. Depending on the particular routing protocol(s) used, various metrics are involved in building the routing database. Such metrics are well known in the art.

Dynamic routing protocols may be interior or exterior with respect to a given autonomous system (AS). Conventionally, interior routing protocols are used for routing within a routing domain or AS (intra-AS). Exterior routing protocols exchange routing information between routing domains (inter-AS). Border Gateway protocol (BGP) is a path-vector routing protocol that is widely used in internetwork routing (see, for example, RFC 1771, *A Border Gateway Protocol* 4 (BGP-4), Y Rekhter and T. Li, 1995). BGP performs both intra-domain and inter-domain routing in networks. A primary function of BGP is to exchange routing information with other BGP systems (peers). BGP's main functions include receiving routes from BGP peers, maintaining the routes in a routing table, applying routing policy specific to the router/AS, transmitting routing updates to other BGP systems, and computing optimal routing paths based on routing metrics. Other BGP functions like maintaining routing sessions (TCP/IP), route aggregation, route flap dampening, etc, are well known in the art.

Prior art routers typically run BGP on a single processor. The computation requirements of main BGP functions increase linearly with the number of peers. BGP doesn't computationally scale well on a single CPU with an increasing number of peers. In prior art systems, accommodation of increasing numbers of peer routers relies on reconfiguring the network by the meshing of multiple separate routers. This approach has a number of drawbacks, including the requirement for considerable increases in network management. A truly scalable BGP should be able to distribute the computational load of the protocol on multiple CPUs.

Another disadvantage of running BGP on a single CPU is that it has a single point of failure. Any local failure results in peer routing sessions dying. Whenever routing sessions fail peers withdraw routes through the local router. When the routes through the local router get withdrawn from all peers, the local router essentially becomes "invisible" to the rest of the network. It no longer gets traffic directed to it for forwarding purposes. BGP running on a single CPU system is not fault-tolerant. In a fault tolerant implementation of BGP, the routing information on the local router and peer router is not lost due to a single point of failure on the local router. A single point of failure on the local router will not result in the router becoming "invisible" to the rest of the network.

As demand for Internet usage continues to expand, there is a need for highly scalable routers having the capacity to handle greatly increased data flow. Scalable routers such as those of the instant invention, are characterized as having a large number of interfaces and a large number of peers. In order to accommodate such large numbers of peers, it is necessary to provide a plurality of processors and to distribute the computational load associated with the large number of protocol peers over the plurality of processors. Running multiple instances of BGP on a multi-processor router not only allows for scalability of the router, but also provides fault-tolerance. Configuring a single router also eases network management.

In order to implement a router running a plurality of instances of BGP, the inventors of the instant application have developed a novel version of BGP, which is referred to herein as router-distributed BGP (rdBGP). Furthermore, in prior art systems and methods, BGP fault tolerance in a given router was not available, due to the fact that a single instance of BGP was running on that router. In contrast, a multi-processor, scalable router of the invention which runs a plurality of BGP instances concurrently, provides for fault tolerance of that router, as will be described herein below.

Scalable routers can also be logically partitioned into logical router entities also know as virtual routers that run independently, sharing the same physical router's resources. We shall use the terms router and virtual router interchangeably herein.

SUMMARY OF THE INVENTION

In a preferred embodiment of the present invention, in an internetwork, a method for operating a distributed path-vector routing protocol within a multi-processor router, comprising the steps of (a) running an instance of a router-distributed Border Gateway Protocol (rdBGP) on each of a plurality of processors of the multi-processor router; (b) establishing routing sessions between individual instances of rdBGP running on separate processors of the multi-processor router, and between individual ones of the instances of rdBGP and external protocol peers; (c) exchanging routing information between instances of rdBGP and the external protocol peers, wherein the instances of rdBGP learn, from the external protocol peers, routes for a plurality of destinations; (d) calculating independently, by each instance of rdBGP, a set of routes, including a best route, for each of the plurality of destinations learned from the locally handled external protocol peers; and (e) sharing route information determined with the other instances of rdBGP running on separate processors in the multi-processor router, and updating route information according to information received from the other instances of rdBGP.

In some preferred embodiments of the invention there is a further step (f) for sharing route information with the external protocol peers. Also in some preferred embodiments a routing session is established between every instance of rdBGP and every other instance of rdBGP. In still further preferred embodiments two instances of rdBGP maintain a routing session with each external protocol peer, providing fault-tolerance thereby.

In some embodiments each of the plurality of instances of rdBGP are in full-mesh communication with each other via a reliable communication mechanism. In some embodiments instances of rdBGP are dynamically assigned to the plurality of external protocol peers based on a metric selected from the group consisting of CPU usage and memory usage.

In another aspect of the present invention a multi-processor router is provided, comprising a plurality of instances of a router-distributed Border Gateway Protocol (rdBGP) executing on each of a plurality of processors, an internal fabric through which the plurality of processors may communicate, and ports through which the rdBGP instances may communicate with external routers. The router is characterized in that each instance of rdBGP establishes a routing session with an external router, learns routes from the external router, and determines a set of routes, including a best route, from the routes learned.

In some preferred embodiments each instance of rdBGP also establishes routing sessions with each instance of rdBGP, and shares route information thereby. In other embodiments each instance of rdBGP re-determines best route information after sharing with other instances of rdBGP, and shares route information with any external router with which it has a routing session. In still other embodiments a routing session is established between every instance of rdBGP and every other instance of rdBGP.

In some preferred embodiments at least two instances of rdBGP maintain a routing session with each external router, providing fault-tolerance thereby. Also in some preferred embodiments each of the plurality of instances of rdBGP are in full-mesh communication with each other via a reliable communication mechanism. In still other embodiments the instances of rdBGP may be dynamically assigned to the plurality of external protocol peers based on a metric selected from the group consisting of CPU usage and memory usage.

In embodiments of the present invention taught in enabling detail below, for the first time, path vector routing protocol is made operable on multi-processor routers in a manner that tasks may be shared and fault tolerance is provided.

DETAILED DESCRIPTION OF THE PREFERRED EMBODIMENTS

Figure 1:
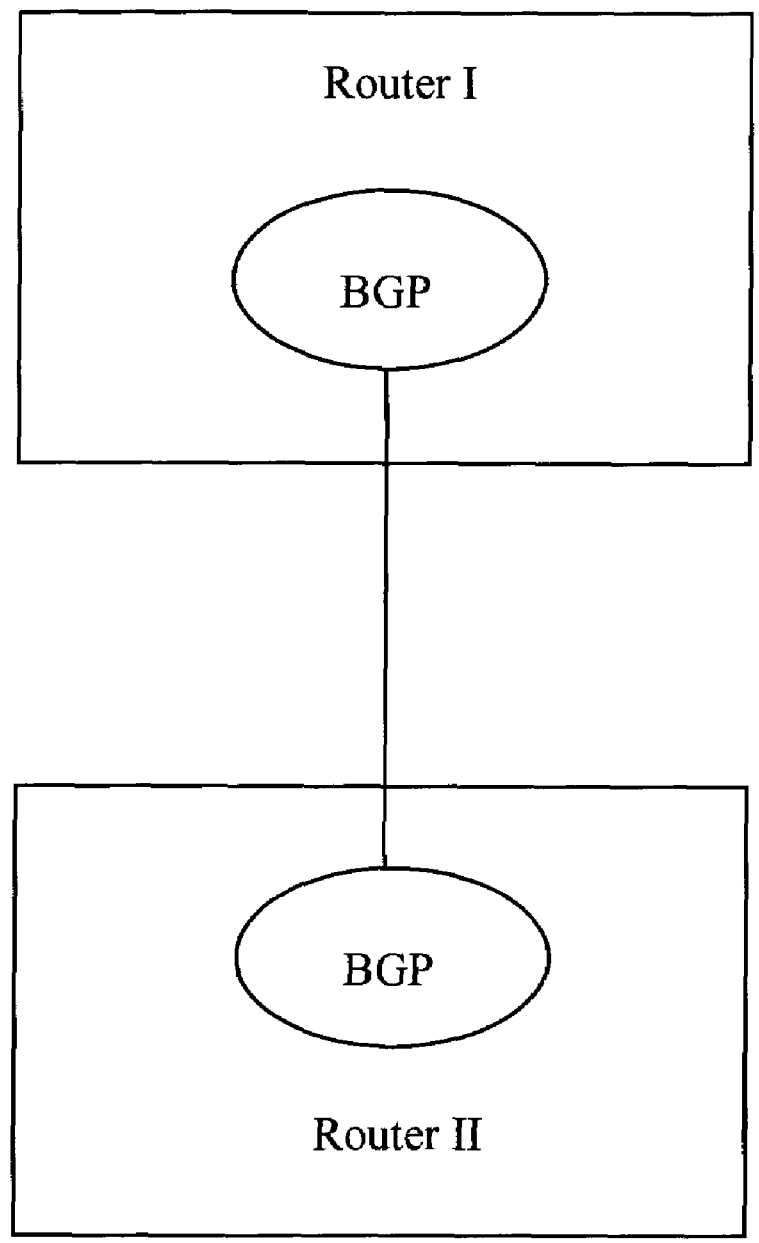
FIG. 1 schematically represents communication between a pair of routers, each router running only a single instance of conventional Border Gateway Protocol (BGP), according to the prior art.

FIG. 1 schematically represents communication between a pair of non-scalable, non-fault tolerant routers, according to the prior art. Each router runs only a single instance of a conventional (prior art) version of BGP. BGP is a path-vector routing protocol which is commonly used for routing both within and between autonomous systems (intra-AS and inter-AS, respectively) in an internetwork (e.g., the Internet). BGP of the prior art is described in, for example, RFC 1711, *A Border Gateway Protocol 4* (BGP-4), Y. Rekhter & T. Li, Editors, 1995. (Reference is also made to RFC 1965, *Autonomous System Confederations for BGP*, P. Traina, 1996; and RFC 1997, *BGP Communities Attribute*, R. Chandra, P. Traina & T. Li, 1996). Again with reference to FIG. 1, a single instance of BGP running on router I is in communication with a single instance of BGP running on router II. Of course, router I and router II may be connected to one or more other prior art routers which in turn run only a single instance of BGP. The architecture shown in FIG. 1 is neither scalable nor fault-tolerant.

Figure 2A:
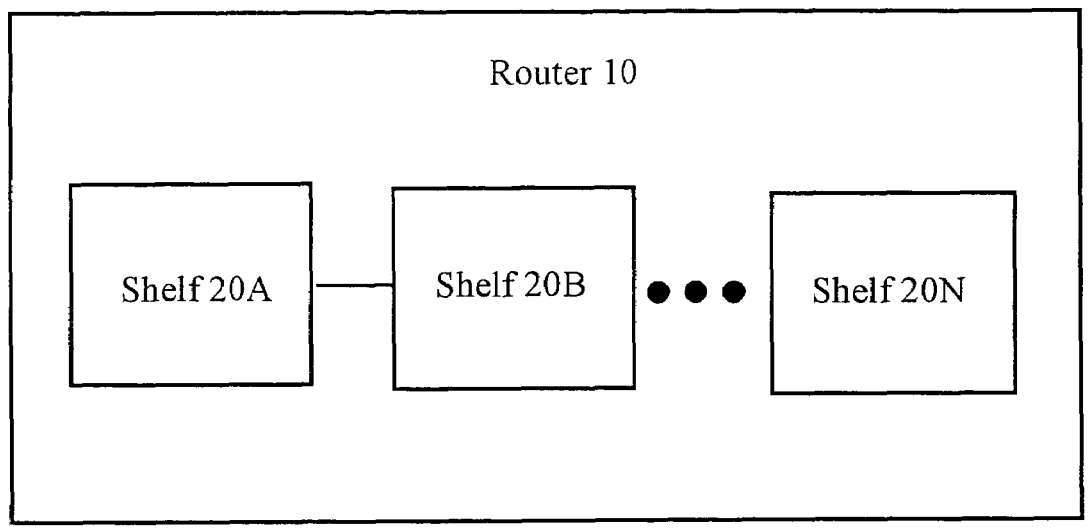
FIGS. 2A, 2B, and 2C are block diagrams which together show the basic architecture of a multi-processor scalable router, according to one embodiment of the invention.
Figure 2B:
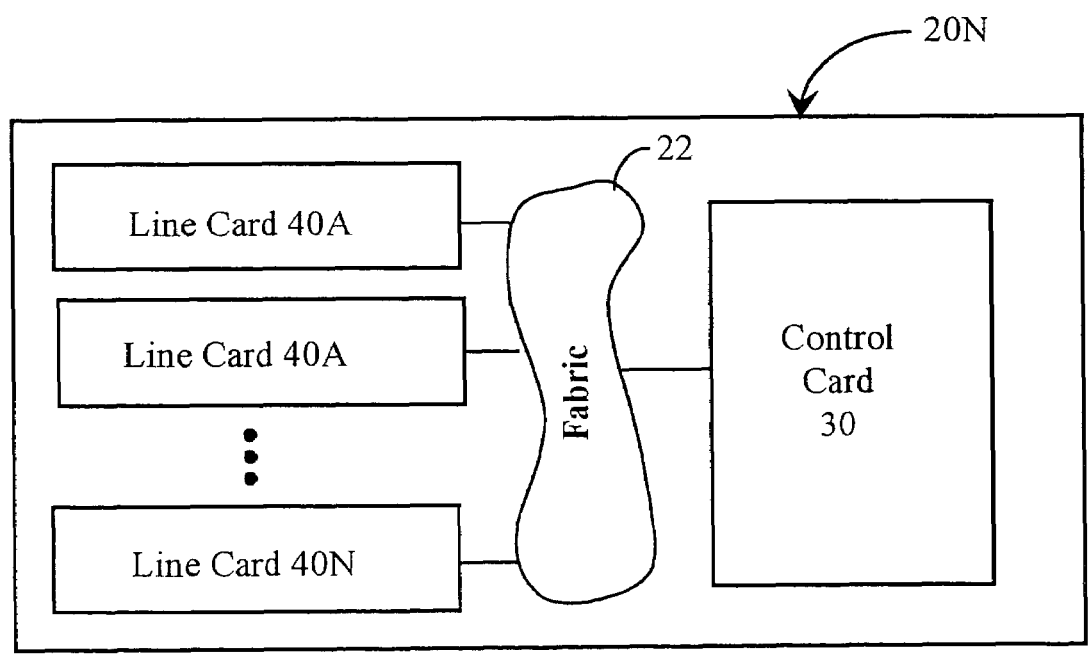
Figure 2C:
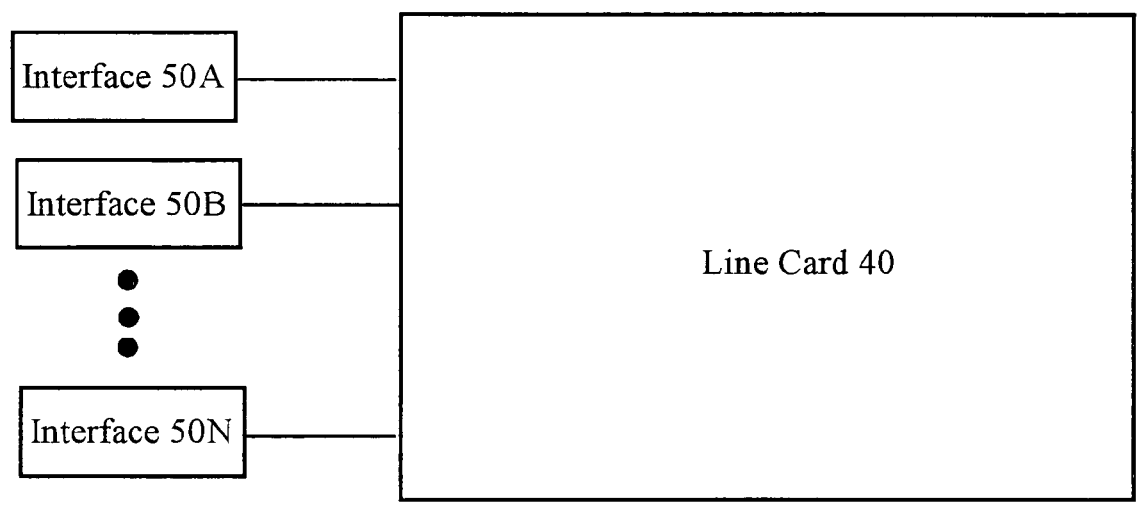

FIGS. 2A, 2B, and 2C schematically represent the basic architecture of a multi-processor scalable router 10, according to one embodiment of the instant invention. FIG. 2A is a block diagram showing the basic architecture of router 10. Router 10 may include a plurality of shelves 20, represented in FIG. 2A as 20A through 20N. As shown in FIG. 2B, each shelf 20 can include at least one control card 30, and a plurality of line cards represented as 40A, 40B, 40N, connecting to control cards through fabric 22. For the purpose of clarity, only one control card 30 and three line cards 40A–40N are shown in FIG. 2B. Control cards typically communicate with control cards and line cards on other shelves as well through the fabric. However, it is to be understood that in practice much larger numbers of control cards 30 and line cards 40 can be used per shelf. Each of the plurality of control cards 30 has at least one processor (not shown) to provide a plurality of processors (microprocessors or CPUS) per router 10

FIG. 2C shows line card 40, which could be any of the line cards from a shelf 20 of router 10. Line card 40 has a plurality of ports, or exterior physical interfaces, represented as 50A, 50B, 50N connected thereto. Although, only three interfaces 50 are depicted in FIG. 2C, it is to be understood that a much larger number of interfaces may be used in practice. A large number of physical interfaces 50 may be logically combined into a single logical interface.

Figure 3:
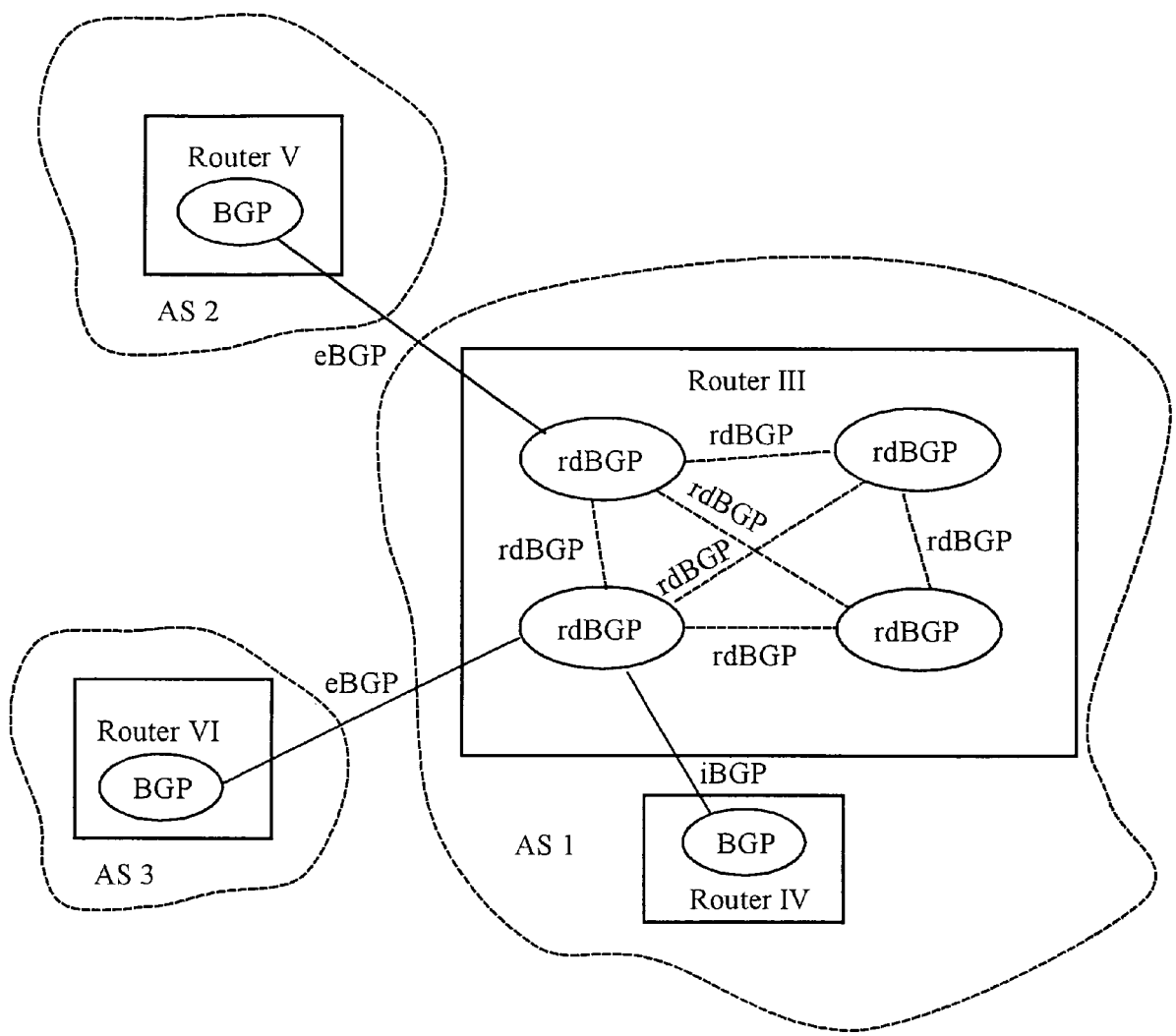
FIG. 3 schematically represents exchange of routing information between multiple instances of a router-distributed BGP (rdBGP) within a multi-processor router, and a non-fault tolerant arrangement for exchange of routing information between instances of rdBGP and external protocol peers, according to one embodiment of the invention.

FIG. 3 schematically represents exchange of routing information between multiple instances of a router-distributed BGP (rdBGP) within a multi-processor router III. Router III has the basic architecture as described hereinabove for router 10 with reference to FIG. 2A–2C. In one embodiment, each of the plurality of processors of router III runs at most one instance of rdBGP. In a currently preferred embodiment, each instance of rdBGP runs on a separate control card 30, and each processor that runs an instance of rdBGP is connected to every other such processor in a full-mesh arrangement through the fabric. The requirement that each instance of rdBGP run on a separate processor is not a limitation of the invention.

Communication between rdBGP instances within router III is via a reliable communication mechanism. Each instance of rdBGP actively participates in routing protocol tasks such as computing the best routes, and sending route advertisements to other instances of rdBGP within router III. Information exchange between instances of rdBGP within router III (i.e. router-internal communication) occurs via rdBGP routing sessions. In a currently preferred embodiment, exchange of routing information between instances of rdBGP is conducted according to proprietary rules. In one embodiment of the invention, each of the plurality of instances of rdBGP have equal status, i.e, all instances are at the same hierarchical level, but this is not a limitation to the invention, as instances of rdBGP might well be arranged in different hierarchical levels in some embodiments of the invention. They communicate by a proprietary rdBGP protocol to exchange routing information.

Again with reference to FIG. 3, a plurality of instances of rdBGP of router III also establish and maintain routing sessions with instances of BGP running on routers other than router III. Such routers may be referred to as external routers, and BGP instances running on the external routers may be referred to as external protocol peers. Such external routers may be in the same autonomous system (AS) as router III, as in the case of router IV, which is located within AS 1; or in autonomous systems other than AS 1, e.g., routers V and VI which are located in AS 3 and AS2, respectively. The terms autonomous system and domain may be used interchangeably herein. BGP routing sessions between routers in different domains are exterior Border Gateway Protocol (eBGP) sessions. BGP routing sessions between routers in the same domain are interior Border Gateway Protocol (iBGP) sessions.

Each instance of rdBGP may be assigned one or more external protocol peers with which to establish a routing session and to exchange routing information therewith. These are referred to as locally-handled external protocol peers. Such assignment may be based on configuration, or may be performed dynamically on the basis of one or more metrics. Examples of such metrics are CPU usage or memory usage related to particular BGP instances. FIG. 3 is for illustrative purposes and is not intended to limit the invention in any way. Thus, although FIG. 3 shows four instances of rdBGP, three external routers, three routing sessions, and three autonomous systems, in practice, larger numbers of each of these entities may be involved in internetwork routing according to the instant invention.

BGP instances running on routers other than router III may be a conventional (previously known) version of BGP. Alternatively, instances of rdBGP running on router III may establish external routing sessions with other rdBGP instances (running on other multi-processor routers, e.g. router(s) analogous to router III), either within the same AS or in a separate AS. The embodiment of FIG. 3 represents a scalable, non-fault tolerant arrangement for exchange of routing information between instances of rdBGP and external protocol peers, because there is at most one routing session per external protocol peer. The non-fault tolerant embodiment of FIG. 3 has the advantage that the plurality of instances of rdBGP running on router III appear to other network devices (e.g. routers) as a single instance of BGP.

Figure 4:
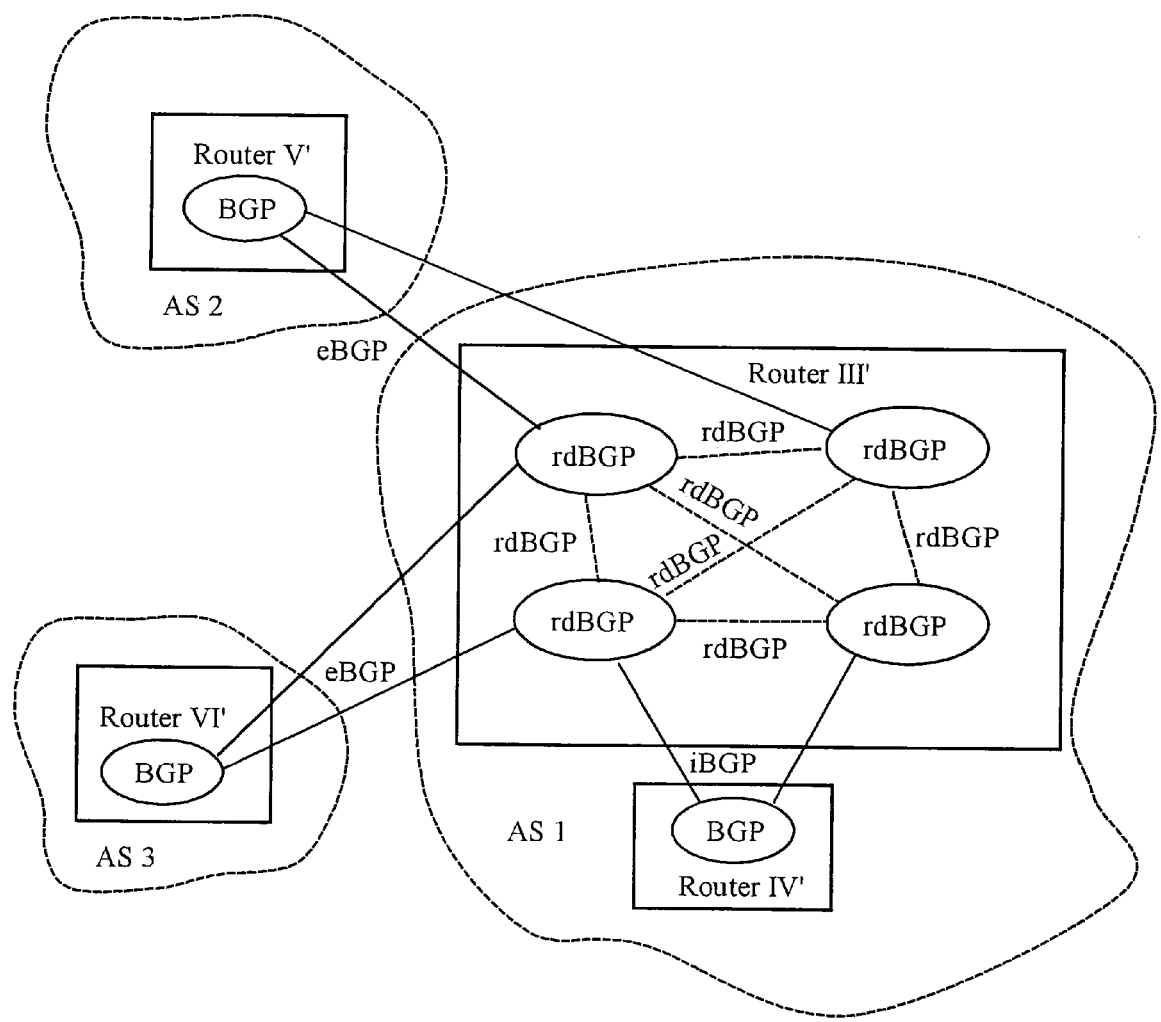
FIG. 4 schematically represents exchange of routing information between multiple instances of a router-distributed BGP (rdBGP) within a multi-processor router, and a fault tolerant arrangement for exchange of routing information between instances of rdBGP and external protocol peers, according to another embodiment of the invention.

FIG. 4 schematically represents exchange of routing information between multiple instances of a router-distributed BGP (rdBGP) within a multi-processor router III', and a fault tolerant arrangement for exchange of routing information between instances of rdBGP and external protocol peers, according to another embodiment of the invention. The arrangement shown in FIG. 4 is similar to that described hereinabove with reference to FIG. 3, with the exceptions pointed out herein below. In comparison with the arrangement depicted in FIG. 3, each external router IV', V' and VI' has a routing session with each of two different instances of rdBGP running on router III'. In this embodiment, a copy of the BGP route table database is kept on router III' by virtue of maintaining a routing session with each of two instances of rdBGP, wherein each routing session is terminated on a different CPU of router III'. The external peers also have a copy of the BGP routing database by virtue of maintaining two routing sessions with router III'. A single failure on router III' will not affect the optimal routing path computation on any of the routers.

Although rdBGP instances are shown in FIG. 4 as maintaining a routing session with not more than two external routers, according to the invention, each rdBGP instance may maintain concurrent routing sessions with a larger number of routers. Similarly, although FIG. 4 shows only two instances of rdBGP maintaining concurrent routing sessions with each external router, more than two instances of rdBGP of router III' can each maintain a routing session with the same external protocol peer. In this situation, each of the instances of rdBGP which maintain a routing session with a given external protocol peer appears as a separate router to the external protocol peer. For example, each of the instances of rdBGP which maintains a routing session with router VI' appear as separate routers to router VI'. More generally, if N instances of rdBGP maintain a session with the same external protocol peer (where $N \geq 1$), then to that external protocol peer the router running the N instances of rdBGP appears as N separate routers (logically). Each external peer is not limited to maintain the same number of routing sessions with router III'.

According to one embodiment of the invention, the plurality of instances of rdBGP running on router III/III' are in full-mesh communication with each other. In one embodiment each of the plurality of instances of rdBGP distributes the route computation, route advertisements, and other protocol functionality among the different rdBGP instances, which may include best routes calculated and other routes and information. In a more particular embodiment, each rdBGP instance computes at least one best route, for each destination, from the full complement of routes learned from their locally handled external protocol peers only, and shares at least one best route with all the other rdBGP instances in router III/III'. Each rdBGP instance also computes the best routes among all routes learned from its locally handled external protocol peers, as well as from the routes advertised by other rdBGP instances of router III/III'. Such best routes computed by rdBGP instances can be used to determine best routes for router III/III', and can be used to construct forwarding tables. Such best routes may also be propagated to external protocol peers of router III/III'. The communication between instances of rdBGP and these instances and external routers, however, is not limited to best route information, but may include other route information, with or without best routes.

The rdBGP described herein is a novel, unique, and proprietary version of BGP as known in the art up to the time of the present application. For example, rdBGP of the invention is specifically adapted for use in a multi-processor, highly-scalable router which runs a plurality of instances of rdBGP concurrently. Features of rdBGP of the instant invention include, but are by not limited to, the following.

i) rdBGP includes a procedure for propagation of multiple routes for the same destination. BGP, on the other hand, can propagate but a single route to a particular destination.

ii) rdBGP includes a procedure for explicit route withdrawal based on route path attributes.

iii) Each rdBGP update includes the identification of the external peer from which the route was learned.

Figure 5:
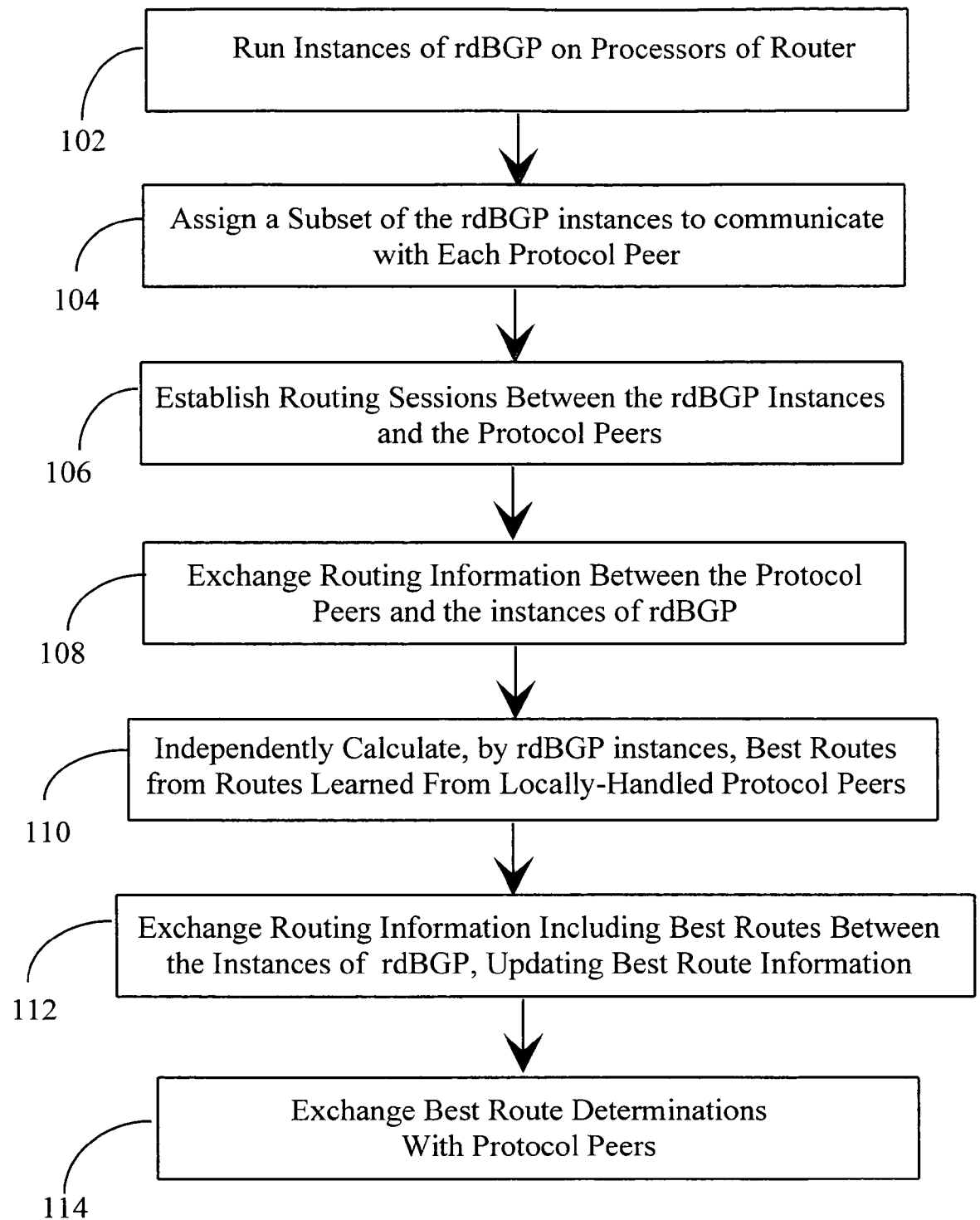
FIG. 5 delineates a series of steps involved in a method of distributing a plurality of instances of a router-distributed BGP (rdBGP) within a multi-processor router, according to the invention.

FIG. 5 illustrates a series of steps involved in a method of distributing and operating a plurality of instances of a router-distributed rdBGP within a multi-processor router, according to an embodiment of the present invention. In the multi-processor router there are a plurality of line cards, a plurality of control cards, and a plurality of interfaces. Each of the plurality of control cards has at least one processor, thereby providing a plurality of processors. Each of the plurality of processors communicates with at least one other of the plurality of processors via a reliable communication mechanism. Step 102 illustrates running a plurality of instances of rdBGP on the plurality of processors of the plurality of control cards. In one embodiment of the invention, not more than one instance of rdBGP runs on any one control card.

Step 104 involves assigning at least a subset of the plurality of instances of rdBGP to communicate with each external protocol peer. Each of the plurality of external protocol peers may be in the same AS as the multi-processor router, or in a different AS. Step 106 involves establishing routing sessions between the rdBGP instances and the plurality of external protocol peers. Such routing sessions are iBGP sessions when the router is in the same AS as the external protocol peer with which it is peering, and eBGP sessions when the router and the external protocol peer are in different ASs.

Step 108 involves exchanging routing information, via routing sessions established in step 106, between external protocol peer(s), on the one hand, and rdBGP instance(s) on the other. As a result of such exchange of routing information, instances of rdBGP involved in routing sessions learn a plurality of routes for each of a plurality of destinations, by receiving routing information from the external protocol peers with which routing sessions were established in step 106.

Step 110. Each instance of rdBGP independently computing a set of routes including the best route from each of the routes learned from the locally-handled external protocol peers (local best routes) with which the instance of rdBGP is in communication.

Step 112 involves the instances of rdBGP within Router III exchanging routes including the best routes learned from the locally-handled external peers, with other rdBGP instances, updating and determining new best routes from the local best route and the independently-determined best routes from other rdBGP instances. In this manner all of the instances of rdBGP will have the same best routes for all externally-learned routes, with at most a minor time variance.

Step 114 involves the individual instances of rdBGP exchanging the new route information with the locally-handled external protocol peers. In this way all instances of rdBGP and all external protocol peers maintain correct routing information.

The method described with the aid of FIG. 5 was predicated on the system of FIG. 3, wherein each external protocol peer is in reliable communication with exactly one instance of rdBGP executing on a processor of Router III. In this apparatus and method, as long as all hardware and software continues to operate reliably, the goal of determining and sharing best routes is met. In the case of degradation and failure of hardware and/or software, however, the goals will not be met. In the system of FIG. 4, however, every external protocol peer is in reliable communication with, and routing sessions are established for, at least two instances of rdBGP executing on, typically, separate local processors of Router III'. In this system by virtue of maintaining two routing sessions with the same external router, Router III' has a redundant copy of all external routing information. Each external router also has a redundant copy of all routing information provided by Router III'. In this system there is fault-tolerance, as any local failure (Router III') can be compensated by virtue of the redundant routes learned by redundant sessions. A single point of failure on the local system doesn't affect routing on the local as well as external systems. In this case an equivalent method exists, analogous to the method described with the aid of FIG. 5 above, wherein at least two instances of rdBGP independently calculate best routes for routes learned from the same external peer. Failure of any instance of rdBGP or of the processor upon which it executes is compensated without hindrance to the result, and time for repair and correction may be scheduled.

The foregoing embodiments are merely exemplary and are not to be construed as limiting the present invention. The present teaching may be applied to other types of apparatuses and methods. The description of the present invention is intended to be illustrative, and not to limit the scope of the appended claims. Many alternatives, modifications, and variations will be apparent to those skilled in the art.

What is claimed is:

1. A fault-tolerant router, comprising:
   a first instance of inter-network routing software resident on a first processor of the fault-tolerant router;
   a second instance of inter-network routing software resident on a second processor of the fault-tolerant router;
   an internal fabric through which the processors communicate; and
   ports through which the instances of inter-network routing software communicate with external routers;
   characterized in that each instance of inter-network routing software establishes a routing session with at least one external router, learns routes from the external routers, and determines a set of routes, including a best route, from the routes learned and the separate instances of software each maintain a routing session with each external router, providing fault-tolerance thereby.

2. The router of claim 1 wherein each instance of inter-network routing software also establishes routing sessions with each instance of inter-network routing software, and shares route information thereby.

3. The router of claim 2 wherein each instance of inter-network routing software re-determines best route information after sharing with other instances of inter-network routing software, and shares route information with any external router with which it has a routing session.

4. The router of claim 1 wherein a routing session is established between every instance of inter-network routing software and every other instance of inter-network routing software.

5. The router of claim 4 wherein each of the plurality of instances of inter-network routing software are in full-mesh communication with each other via a reliable communication mechanism.

6. The router of claim 1, wherein the instances of inter-network routing software are dynamically assigned to the plurality of external routers based on a metric selected from the group consisting of CPU usage and memory usage.

7. A system providing distributed path-vector routing within a single router, comprising:
- a first instance of inter-network routing software resident on a first processor of the router;
- a second instance of inter-network routing software resident on a second processor of the router;
- a communication network enabling routing sessions to occur between the first and second instances of routing software on the first and second processors and a plurality of external routers;
- wherein the first and second instances of inter-network routing software exchange routing information between each other and at least one of the external routers, and the inter-network routing software instances learn from the at least one external router, routes for a plurality of destinations and calculate, independently, a set of routes, including a best route, for each of the plurality of destinations learned from the at least one external router, and wherein the inter-network software instances share the determined route information with each other, and update route information in their respective processors according to the shared route information.

8. The system of claim 7 wherein the instances of inter-network software share the determined routing information with the external router.

9. The system of claim 7 wherein, the instances of inter-network software communicate with additional processors each having an instance of inter-network software resident.

10. The system of claim 9 wherein the first and second instances of inter-network software duplicate routing sessions with external routers, providing fault-tolerance thereby.

11. The method of claim 9 wherein each of the instances of inter-network software is in full-mesh communication with each other via a reliable communication mechanism.

12. The method of claim 9 wherein the instances of inter-network software are dynamically assigned to the plurality of external routers based on a metric selected from the group consisting of CPU usage and memory usage.

* * * * *